April 30, 1963  L. B. HEESEN, SR., ETAL  3,087,709
MIXING APPARATUS FOR POWDERED OR GRANULAR SUBSTANCES
Filed Feb. 5, 1960
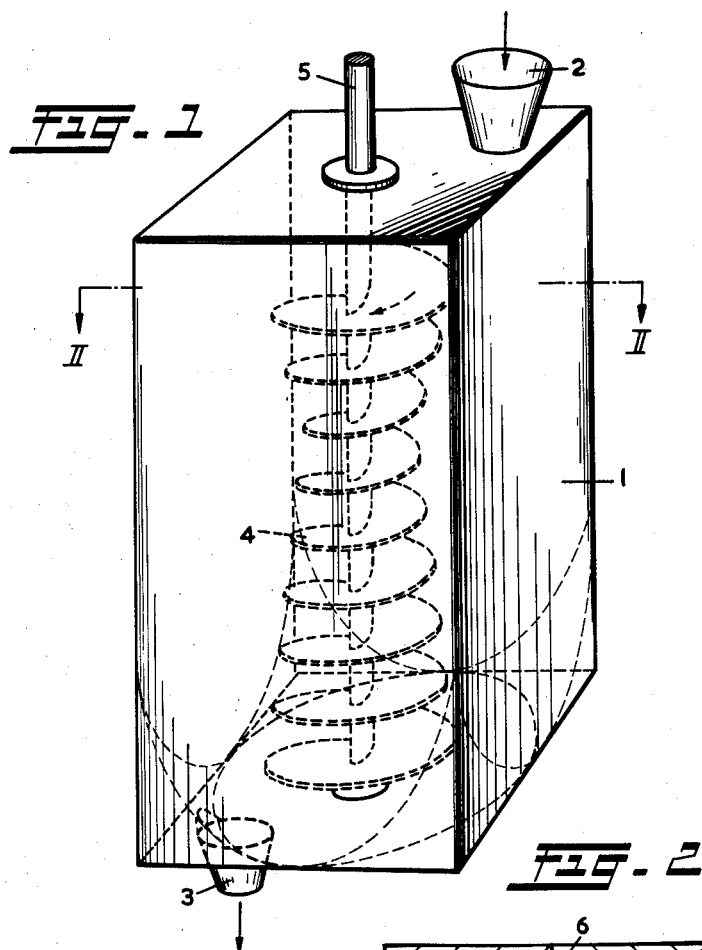
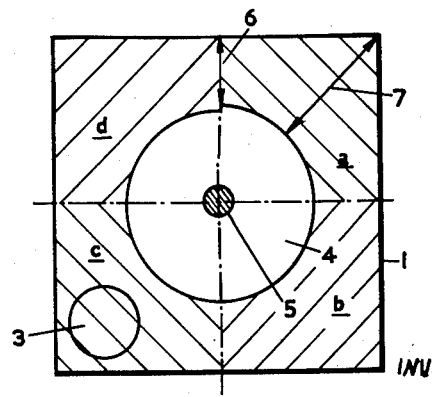
INVENTORS
LEONARDUS B. HEESEN SR.
THEODORUS J. HEESEN
LEONARDUS B. HEESEN JR.
BY
Wenderoth, Lind + Ponack
Attys.

United States Patent Office 3,087,709
Patented Apr. 30, 1963

3,087,709
MIXING APPARATUS FOR POWDERED OR
GRANULAR SUBSTANCES
Leonardus Bernardinus Heesen, Sr., Molenstraat 61,
Theodorus Jacobus Heesen, Doornakkerlaan 25, and
Leonardus Bernardinus Heesen, Jr., Stationsstraat 86,
all of Boxtel, Netherlands
Filed Feb. 5, 1960, Ser. No. 7,000
Claims priority, application Netherlands Feb. 6, 1959
2 Claims. (Cl. 259—107)

This invention relates to a mixing apparatus for powdered or granular substances comprising a mixing vessel and a conveyor worm mounted for rotation about its stationary vertical axis in said vessel.

Achieving an at least somewhat homogeneous mixing by means of a mixing apparatus of this generally known type takes so much time that under present-day circumstances the use of a mixing apparatus of the type in question is in point of fact no longer economically justified, though for want of a better apparatus said conventional mixing apparatuses are still being used.

The object of the invention is to put an end to this state of things by an improved construction of this type of mixing apparatuses. The invention is based on the insight that the mixing operation of the apparatus admits of being appreciably improved and accelerated by creating laminar flows of different speeds in the product moving down within the mixing vessel, which product has first been carried upwards by the conveyor worm.

To achieve this end according to the invention the mixing vessel of the mixing apparatus according to the invention is so formed that in each horizontal section of said mixing vessel within the mixing zone the radial distance between the circumference of the conveyor worm and the inner wall of the mixing vessel repeatedly increases and decreases between a minimum and a maximum during each revolution of the conveyor worm.

The invention will be illustrated with reference to the schematic drawing which by way of example shows one of the numerous embodiments of the mixing apparatus according to the invention that are possible.

In said drawing:
FIG. 1 is a perspective showing of the mixing apparatus;
FIG. 2 is a horizontal sectional view on line II—II in FIG. 1.

According to the drawing the mixing apparatus comprises a mixing vessel 1, provided with a filling funnel 2 and a closable outlet 3, a conveyor worm 4 being centrally arranged in the mixing vessel, the vertical shaft 5 of said conveyor worm being adapted to be driven in an appropriate manner. The square horizontal section of the mixing vessel chosen for this embodiment has the advantage that the vessel may be manufactured easily and thus cheaply and that more particularly a plurality of mixing apparatuses may conveniently be arranged side by side, without unused spaces being left between them.

The materials to be mixed are moved upwardly in the mixing vessel by the rotating conveyor worm 4 and at the upperside of said worm they are thrown aside into one of the sectors a, b, c and d which may be conceived of as being located between the circumference of the conveyor worm and the inner wall of the mixing vessel. Because said sectors a, b, c, d each have a width, if measured radially relative to the shaft 5, which varies between a minimum 6 and a maximum 7, a laminar flow pattern will result during the downward movement of the materials in said sectors, the partial flows having mutually different speeds which greatly promote the intimate mixing of the downwardly moving materials.

It stands to reason that by filling up the bottom corners of the mixing vessel the flow of the mixture towards the lower end of the conveyor worm will be promoted.

In order that also during the upward movement of substances to be mixed as great as possible a mixing operation may be achieved and that at the same time the substances arriving at the upper portion of the mixing zone will be distributed in as favourable as possible a manner over the sectors a, b, c and d it is advisable to use a conveyor worm having a hyperboloidal shape, that is the diameters of the successive convolutions decrease from the ends of the conveyor to the middle thereof, as is schematically shown in FIGURE 1. For the rest it will in many cases be sufficient to use a conveyor worm which is cylindrical or which tapers from the bottom upwards or from the top downwards. In all cases the radius of the conveyor worm is preferably so chosen that at the lower end of the worm it is larger than half the smallest distance from the axis of the mixing vessel to the inner wall of said vessel.

In a mixing apparatus according to the invention the mixing proceeds incomparably more rapidly than in any one of the known mixing apparatuses of the type in question, while moreover the homogeneity of the mixture is such that it can hardly be improved upon.

It stands to reason that there is a great freedom in the choice of the shape of the horizontal section of the sectors a, b . . . etc. and in the number of said sectors. Said choice will also be determined by the nature of the substances to be mixed and by considerations of a technical nature that play a part in the manufacture of the mixing vessel.

We claim:
1. A mixing apparatus for powdered or granular substances, comprising a mixing vessel having a vertical axis and the cross section thereof perpendicular to said axis having a plurality of sectors, and a conveyor worm mounted for rotation about said vertical axis in said vessel and having convolutions the diameter of which varies gradually along the vertical axis of said worm decreasing from one end of said worm toward a point intermediate the ends of the worm and then increasing from said intermediate point toward the other end of the worm, said vessel having a wall parallel to said axis in each of said sectors with a shape such that a radial distance between the circumferential edge of the conveyor worm and the wall changes at least once from a minimum to a maximum and then returns to a minimum.

2. A mixing apparatus for powdered or granular substances, comprising a mixing vessel having a vertical axis and the cross section thereof perpendicular to said axis having a plurality of sectors, and a conveyor worm mounted for rotation about said vertical axis in said vessel and having convolutions the diameter of which varies gradually along the vertical axis of the worm in a hyperboloidal shape, said vessel having a wall parallel to said axis in each of said sectors with a shape such that the radial distance between the circumferential edge of the conveyor worm and the wall changes at least once from a minimum to a maximum and then returns to a minimum.

References Cited in the file of this patent
UNITED STATES PATENTS

| | | |
|---|---|---|
| 1,394,371 | Strauss | Oct. 18, 1921 |
| 2,702,184 | Griffith | Feb. 15, 1955 |
| 2,798,701 | Collura | July 9, 1957 |

FOREIGN PATENTS

| | | |
|---|---|---|
| 184,397 | Great Britain | Aug. 17, 1922 |